(12) United States Patent
Bhavnani et al.

(10) Patent No.: US 7,236,994 B2
(45) Date of Patent: Jun. 26, 2007

(54) ELECTRONIC CALCULATING HAND HELD IMPLEMENT

(75) Inventors: Dilip Bhavnani, Beverly Hills, CA (US); Todd Zimmermann, Moorestown, NJ (US)

(73) Assignee: Sun Most, LLC, Commerce, CA (US)

( * ) Notice: Subject to any disclaimer, the term of this patent is extended or adjusted under 35 U.S.C. 154(b) by 0 days.

(21) Appl. No.: 11/148,681

(22) Filed: Jun. 8, 2005

(65) Prior Publication Data

US 2006/0282486 A1 Dec. 14, 2006

Related U.S. Application Data

(63) Continuation-in-part of application No. 11/051,203, filed on Feb. 3, 2005, now Pat. No. 7,033,102, which is a continuation-in-part of application No. 10/916,652, filed on Aug. 11, 2004, now Pat. No. 6,890,117.

(60) Provisional application No. 60/510,561, filed on Oct. 10, 2003.

(51) Int. Cl.
*G06F 15/02* (2006.01)

(52) U.S. Cl. ...................................... 708/107

(58) Field of Classification Search .................. 708/107
See application file for complete search history.

(56) References Cited

U.S. PATENT DOCUMENTS

| | | | | |
|---|---|---|---|---|
| 4,007,364 A | * | 2/1977 | Ojima et al. ................ | 708/107 |
| 4,141,073 A | * | 2/1979 | Tan .............................. | 708/107 |
| 4,241,409 A | * | 12/1980 | Nolf ............................ | 708/107 |
| 4,374,425 A | * | 2/1983 | Fuka ........................... | 708/145 |
| 4,404,643 A | * | 9/1983 | Ojima et al. ................ | 708/107 |
| 4,984,494 A | | 1/1991 | Yang | |
| 5,028,764 A | | 7/1991 | Kuhlengel | |
| 5,754,645 A | | 5/1998 | Metroka et al. | |
| 6,104,603 A | | 8/2000 | Wang | |
| 6,742,953 B2 | * | 6/2004 | Burden et al. ............... | 401/194 |
| D500,518 S | | 1/2005 | Fraser et al. | |
| 6,890,117 B2 | | 5/2005 | Hazzard | |

* cited by examiner

*Primary Examiner*—D. H. Malzahn
(74) *Attorney, Agent, or Firm*—The Soni Law Firm

(57) ABSTRACT

An hand held implement which includes an integral preprogrammed electronic calculator. The implement is preset to perform one or more calculations which utilize known scientific formulas and mathematical relationships and which rely upon specific variables for which values are input by the user through the use of the various input command control devices and may be reused for further serial calculations. By preprogramming the implement with the related formulas for a given field of technology, the user may perform one or even a series of related and useful calculations without the need for any additional calculators, charts, tables or other printed materials. The surfaces on the implement may also be used for the imprinting of graphical or advertising material for the purpose of advertising or promotion.

20 Claims, 10 Drawing Sheets

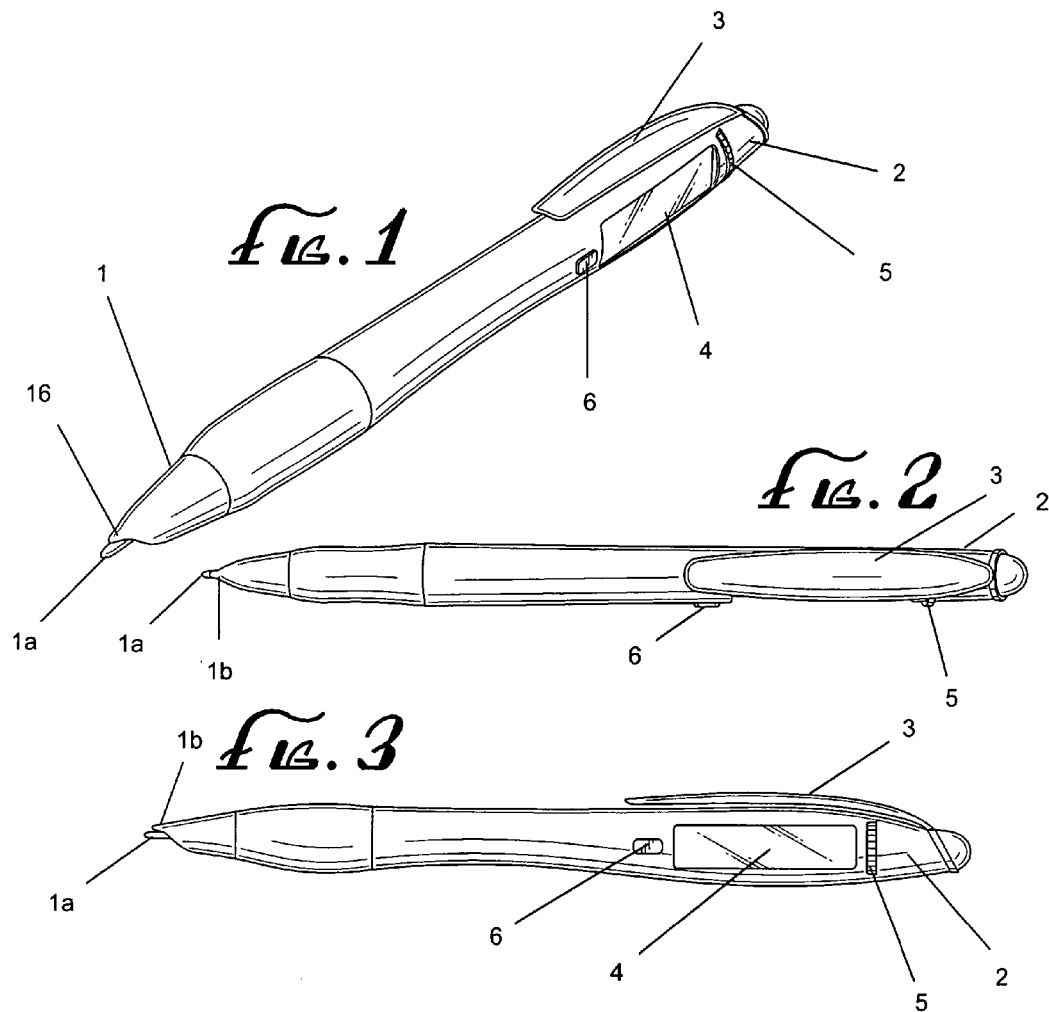
MEDICAL CALCULATIONS
MAIN SCREEN
*fig. 4A*
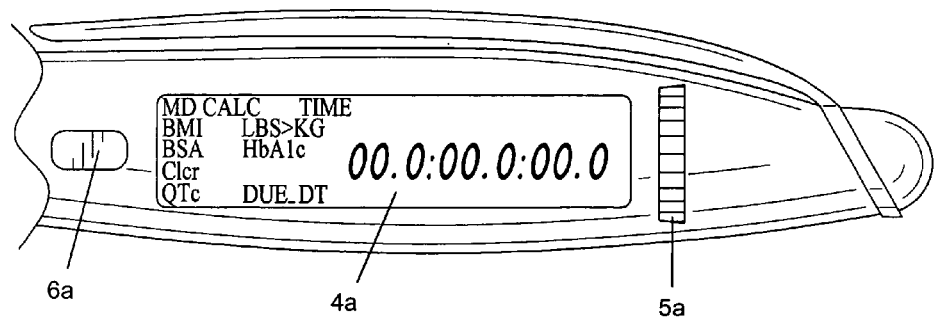

QTc

QTc

QTc

POUNDS TO KILOGRAMS

POUNDS TO KILOGRAMS

HbA1c

HbA1c

PREDICTED PEAK EXPIRATORY FLOW
(MALES AND FEMALES)

PREDICTED PEAK EXPIRATORY FLOW
(MALES AND FEMALES)

PREDICTED PEAK EXPIRATORY FLOW
(MALES AND FEMALES)

PREGNANCY CALC

PREGNANCY CALC

PREGNANCY CALC

ELECTRONIC CALCULATING HAND HELD IMPLEMENT

CROSS-REFERENCE TO RELATED APPLICATIONS

This application claims priority to and is a continuation-in-part application of utility patent application Ser. No. 11/051,203 filed on Feb. 3, 2005 now U.S. Pat. No. 7,033,102 which is a continuation-in-part application of utility patent application Ser. No. 10/916,652 filed Aug. 11, 2004 (now issued as U.S. Pat. No. 6,890,117) which was originally filed as provisional application Ser. No. 60/510,561 on Oct. 10, 2003. Both applications were owned by the Assignee, Sun Coast Merchandise Corp, at the time of the present inventions.

FIELD OF THE INVENTION

The present invention is directed to the field of hand held implements. More specifically, the invention is directed to a hand held implement which incorporates an electronic preprogrammed calculator for the computation of specific measures based on known formulas for which the user would supply and input values in order to carry out a desired computation. The present invention also permits the use of a simple set of input variables to conduct a series of preprogrammed calculations in a serial manner.

BACKGROUND OF THE INVENTION

The present invention generally relates to a hand held implement which is capable of computing at least one and typically would perform numerous calculations, generally using a single set of input variables (which are related by their mathematical formulas and/or their interrelated technological relationships or values). For example, a physician may use such an implement to calculate the various physiological relationships for a patient, such as their Body Mass Index, Body Surface Area, Creatinine Clearance and Hemoglobin A1C to Mean Plasma Glucose Estimation and other associated measures. In the past, upon examining a patient and obtaining his or her vitals, the medical service provider would then refer to separate specific formulas and tables to compute the desired information for the patient.

Similarly, professionals such as mortgage brokers or car salesmen, engineers, mechanics or bartenders commonly encounter repetitive needs to conduct calculations based on mathematical formulas. In the case of an engineer, he or she may require a calculation for stress, bending, forces, torque and many other measures. Mortgage brokers and salesmen may need to calculate interest rates, down payments required, monthly payments and other calculations derived from the same basic known formulas.

While hand held calculators may perform some of these functions, their very size and nature, make them not as desirable as an implement the size of a writing pen. Moreover, previously designed calculators typically perform singular functions and do not incorporate preprogrammed mathematical formulas for the calculation of specific measures or values required in particular fields of use. Moreover, commonly known calculators can not be secondarily used as a writing implement, stylus or other pointed tip type of instrument.

The need for a calculating product incorporated in a hand held implement has been attempted in the past. U.S. Pat. No. 5,028,764 to Kuhlengel discloses a pen with rotatable cylindrical elements that is used to perform a simple calculation in the multiplication of two numbers. In this patent, the invention provides its user no capability to perform a specific calculation based upon a preprogrammed known scientific formula, as the pen will not permit a calculation other than basic multiplication and relies upon the user to supply a formula. U.S. Pat. No. 4,141,073 to Tan describes a pen which may be used to perform various calculations. In that pen, signals generated by the pen tip through designated strokes of numerals and calculating symbols upon writing on any surface of any writing medium are input directly to the calculator to perform calculating and displaying functions. The Tan invention therefore is doubly complicated as it relies upon the user to know or refer to a specific formula and thereafter demands the user essentially tap out a series of carefully orchestrated movements in order to perform even the simplest calculation. Therefore, neither patent involves a device which may be employed to quickly determine the numerical outcome of a specific formula or equation, such as the Body Surface Area of a person, based jointly on multiple variables, in this case the two factors being their height and weight.

U.S. Pat. No. 6,104,603 to Wang discloses a writing pen with an integral electronic calculator including printed circuit board, keyboard and power supply. While this invention is perhaps more versatile than those of Kuhlengel and Tan, it too is nothing more than the insertion of a hand held calculator into a pen. The user must still refer to outside formulas and take care to properly input any specific variables if they wish to perform a calculation based on a specific known formula. Moreover, that device has little or no capability to handle non-linear and other unusual relationships between variables in a known scientific formula, such as those physiological factors for which different values must be used for each sex.

Perhaps the biggest drawback of these types of calculating implements is the user must input the required variables each time they wish to perform a calculation. For example, a doctor using these implements would have to perform two separate calculations and input the same numerical values twice if, for example, they wished to compute a patient's body mass index and their body surface area, despite the fact that these related calculations are both based on the patients height and weight. The requirement for repetitive inputting of the same numerical values only serves to increase the prospect of human error, which in the medical profession may give rise to serious consequences.

U.S. Pat. No. 6,890,117 to Hazzard describes a calculating pen for calculating the body mass of an individual. This invention, however, is manually operated and fails to include an electronic calculator. It is therefore limited in the scope and range of calculations which may be performed with any given implement.

What is needed is a hand held implement which is designed for use in a specific field whereby its incorporated electronic calculator is preprogrammed with the particular variables and mathematical formulas required on a repetitive basis in the field. To have a simple hand held device on which the user may input a set of numerical values for particular variables to compute a specific formula result for a known measure is highly desirable. Furthermore, a device which permits the user to input variables once and thereafter use those same variables for successive computations while using different formulas would render a significant benefit for time savings and error avoidance. This invention would permit the user to be free of voluminous and bulky manuals, reference books and other tools previously required and from which the scientific formulas may be gathered.

What would be most desirable is a hand held implement which incorporates an integral calculator and also avails user friendly interface controls such that the user may quickly and easily input the particular numerical values of interest and select the appropriate mode command to perform the desired computation.

SUMMARY OF THE INVENTION

The present invention addresses and overcomes the need for the an individual to have at hand the above described hand held calculators, books and manuals by providing a hand held implement that combines an implement tip with an electronic preprogrammed calculator to determine the results of multiple specific formulas. For example, in one field of embodiment as detailed below, health-care providers can use the invention as a preprogrammed calculator to determine one or more of the: Body Mass Index, Body Surface Area, Creatinine Clearance and Hemoglobin A1C to Mean Plasma Glucose Estimation and other associated measures of a patient, and as a writing pen for recording information in patient charts, submitting prescriptions, and the like.

In another embodiment, the implement would be utilized by a mortgage broker. or a car salesman. It could be preprogrammed with the appropriate linear and non-linear formulas to calculate the interest amounts, down payments, lease rates and factors, monthly payment and other desirable values for such transactions.

Similarly, an engineer may operate the implement, using a different equation and sets of numerical values to perform many of the required calculations of their occupation, such as forces, stresses, beam energy developed/consumed, horsepower, speed and acceleration relationships and the like.

The present invention combines an implement and tip with a calculating function in one lightweight and commonly used type of device, thereby freeing the user of the need to refer to complicated charts or other technical materials. These and other objects, features, and advantages of the invention are evident from the following description and attached drawings.

In a preferred embodiment of the invention, the writing implement has a first end which includes the writing tip portion and a second end which includes the preprogrammed calculator and display screen, such as would be used to calculate the various health care provider formulas. In addition to the display screen, the second end would typically house the user input controls. These controls may be buttons, switches, dials or any number of easily manipulated controls. Through a sequential operation of the input controls the user may select a particular variable used in the formula(s) and thereafter input a specific numerical value for the variable, such as the patient's weight or height, in the case of a medical provider.

Upon selecting a particular mode of calculation, the user may then enter the appropriate numerical values depending on which of the preprogrammed mathematical formulas is desired. A simple operation of the input, mode and entry commands permits the user to begin computing the various related calculations based on the implement's preprogramed formulas. In some embodiments, the user would enter the variable values each time a different formula is used, while in other embodiments, those same input numerical values can be used serially for other preprogrammed calculations without the need of the repeated inputting of these same variables.

The present invention thereby introduces a hand held implement which has the concurrent ability to function as a preprogrammed calculator for specified formulas and measures, as well as a tipped implement, such as a pen or stylus. Examples of such implements contemplated within the scope of the present invention include writing implements such a pens and pencils, laser pointers, conventional pointers, cutting implements such as knives, awls and scribes, and other hand-held implements such as brushes, cosmetics applicators, soldering devices and computer styluses.

While the preferred embodiment involves an implement for the medical field, the present invention is contemplated to include a device capable of computing related calculations involving specific mathematical relationships arising in a particular field, such as those encountered in career fields including, but not limited to, human physiology, medicine, real estate, mortgage banking, engineering, vehicle sales or leasing, nursing, banking, automotive technology, aerospace, plumbing, electrical, construction, chemistry, statistics, sports, food manufacturing, baking, beverage production and mixology.

Finally, it is contemplated that any of the numerous outer surfaces of the hand held implement are well suited for and may be utilized for the imprinting of graphical or advertising material for the purposes of advertising or promotion.

BRIEF DESCRIPTION OF THE DRAWINGS

These and other aspects of the invention will now be described with reference to the accompanying drawings, in which:

FIG. 1 illustrates a front perspective view of a preferred embodiment of the hand held implement in the configuration of a pen with a secondary stylus tip and shows the display screen and input and selection controls.

FIG. 2 illustrates a top view of a preferred embodiment of the hand held implement in the configuration of a pen with a secondary stylus tip and optional attachment clip.

FIG. 3 illustrates a front view of a preferred embodiment of the hand held implement in the configuration of a pen with a secondary stylus tip and optional clip and this drawing further shows the display screen and input and selection controls.

DETAILED DESCRIPTION OF THE INVENTION

Figure 4B:
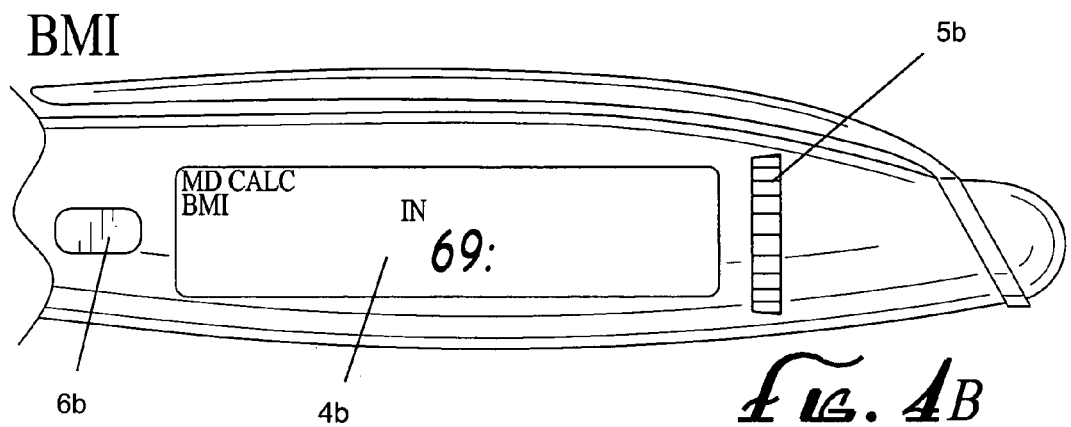
FIGS. 4A through 4X are sectioned views depicting only the second end of preferred embodiments of the hand held implement in the configuration of a pen with a secondary stylus tip and optional clip as the invention might be utilized by a medical practitioner. Each of these views, as referenced below, detail the display screen image for a given input control and/or mode selection sequence in the computation of various formulas in the preferred embodiment of the implement as a pen which is preprogrammed to conduct a series of computations directed toward the medical services provider.

The accompanying Figures depict embodiments of the present invention, and features and components thereof. With regard to means for fastening, mounting, attaching or connecting the components of the present invention to form the apparatus as a whole, unless specifically described otherwise, such means are intended to at least encompass conventional fasteners such as machine screws, machine threads, snap rings, hose clamps such as screw clamps and the like, rivets, nuts and bolts, toggles, pins and the like. Components may also be connected by friction fitting, snap fitting, adhesives, or by welding or deformation, if appropriate. Unless specifically otherwise disclosed or taught, materials for making components of the present invention are selected from appropriate materials such as metal, metallic alloys, natural or synthetic fibers, plastics and the like, and appropriate manufacturing or production methods including casting, extruding, injection molding and machining may be used.

Any references to front and back, right and left, medial and lateral, top and bottom, upper and lower, superior and inferior, and horizontal and vertical are intended for convenience of description, not to limit the present invention or its components to any one positional or spacial orientation.

The present invention involves a preprogrammed electronic calculator which is incorporated into a hand held implement. The invention is aimed at providing an implement which is equipped with certain formulas and mathematical relationships preprogrammed into the calculator such that an individual user in a particular field or having a particular area of interest will have a compact and easily portable functional device capable of the repetitive calculations one would typically encounter in such a selected field or area of interest.

In addition to having the capability to perform the desired calculations, the present invention is configured as a hand held implement. Accordingly, it maintains a secondary use as an instrument such as a pen. In order to do so, the invention must be extremely compact and should be aesthetically appealing. Examples of such implements contemplated within the scope of the present invention include writing implements such a pens and pencils, laser pointers, conventional pointers, cutting implements such as knives, awls and scribes, and other hand-held implements such as brushes, cosmetics applicators, soldering devices and computer styluses.

Referring to FIG. 1, the present invention is shown in a preferred embodiment wherein the implement tip includes both an ink pen and a stylus tip. The invention comprises a first end 1 and a second end 2, and in this case, the first end 1 further includes both an ink tip 1a and a stylus point 1b. The second end 2 further includes an optional clip 3, also shown in FIG. 2. Referring now to FIGS. 1 and 3, the front side of the preferred embodiment shown has a display screen 4, an input control device which is in this embodiment a rotating dial 5 referred to as "DIAL" 5 and a secondary selection control 6, in this case a press switch referred to below as the "BACK control command" 6. This DIAL 5 may be rotated to scroll up or down to a desired numerical value for any of the given calculations. Upon reaching the appropriate numerical value on the display screen 4, the DIAL 5 may be pressed radially inward to input that value into the calculator.

Figure 4C:
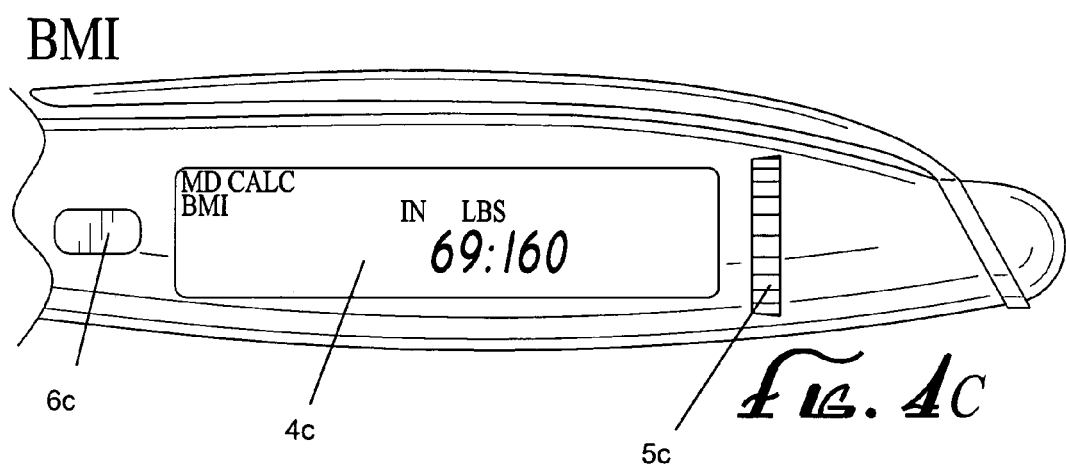
Figure 4D:
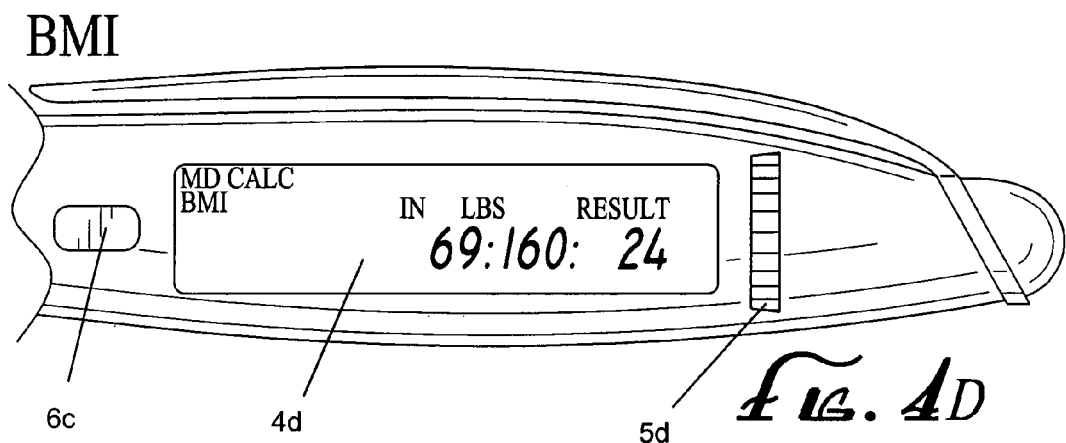
Figure 4E:
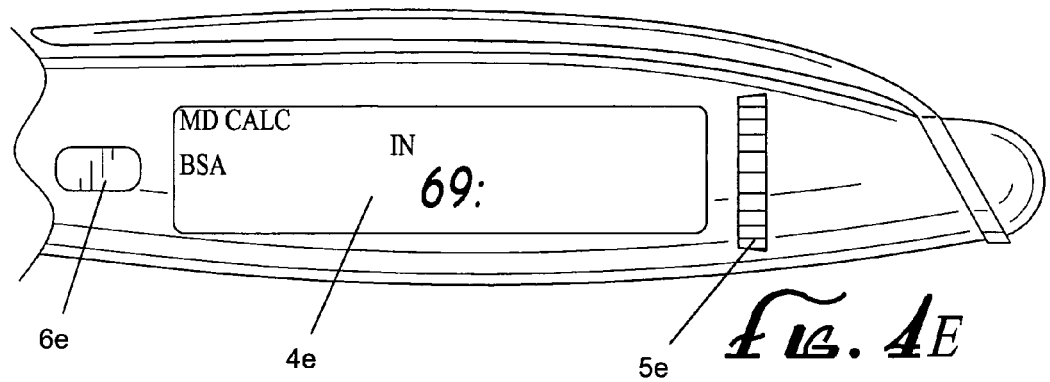
Figure 4F:
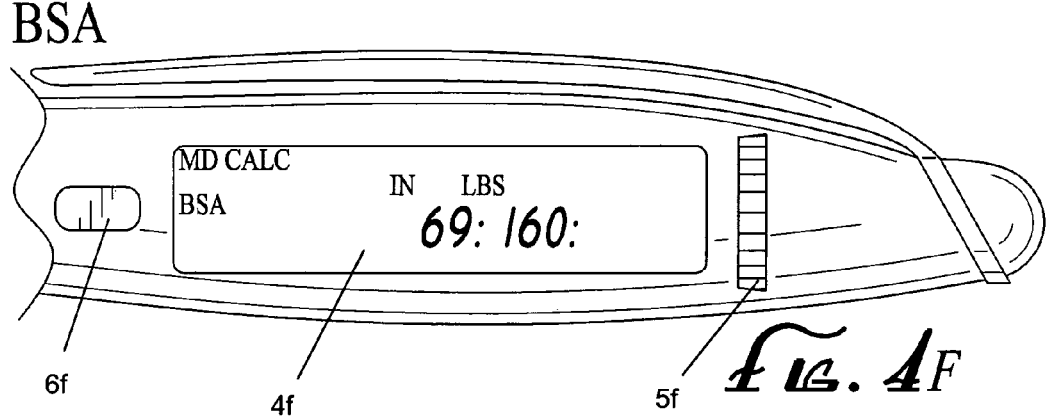
Figure 4G:
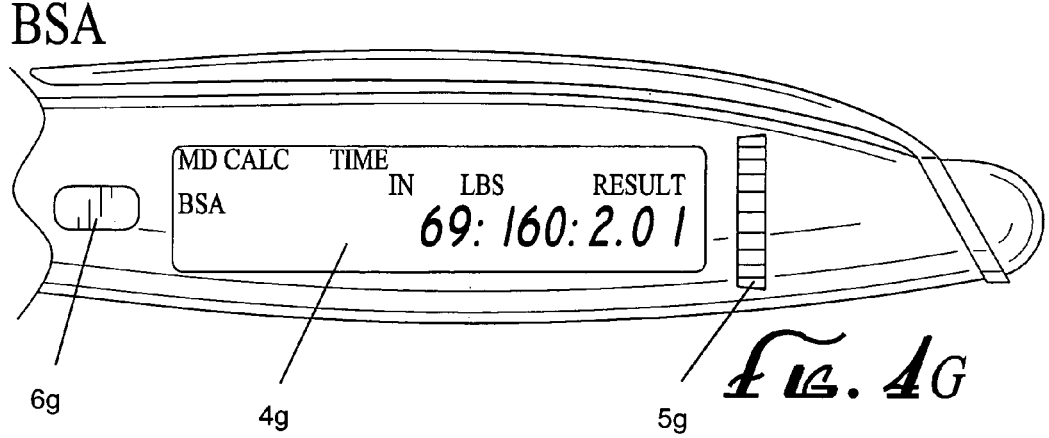
Figure 4H:
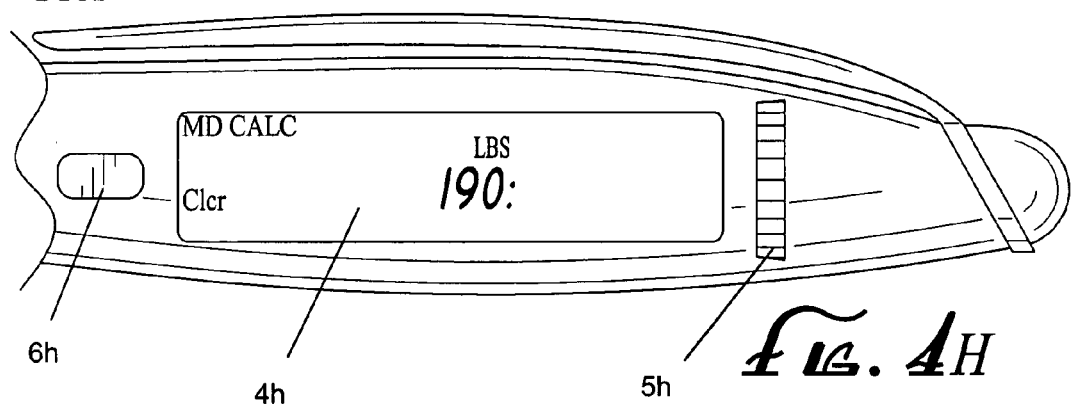
Figure 4I:
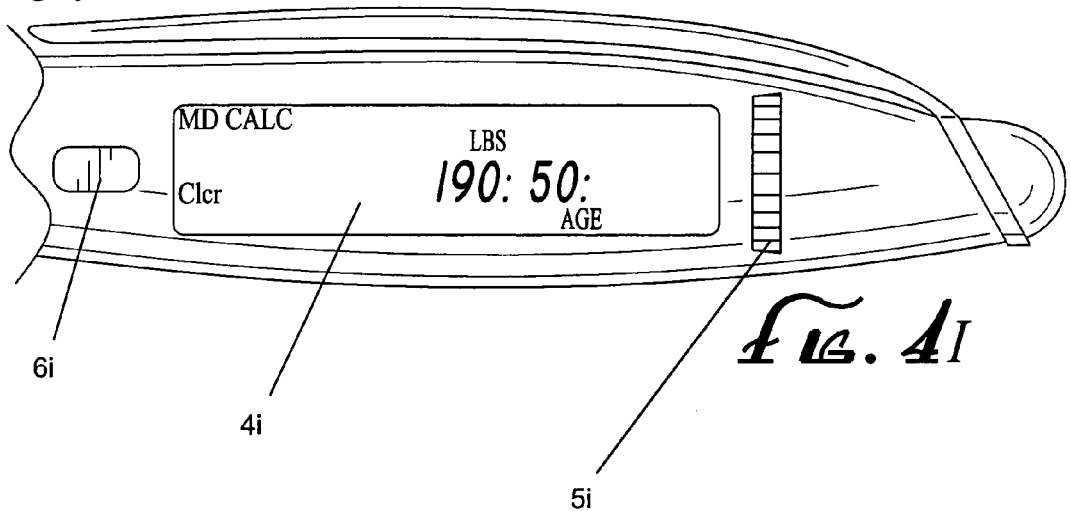
Figure 4J:
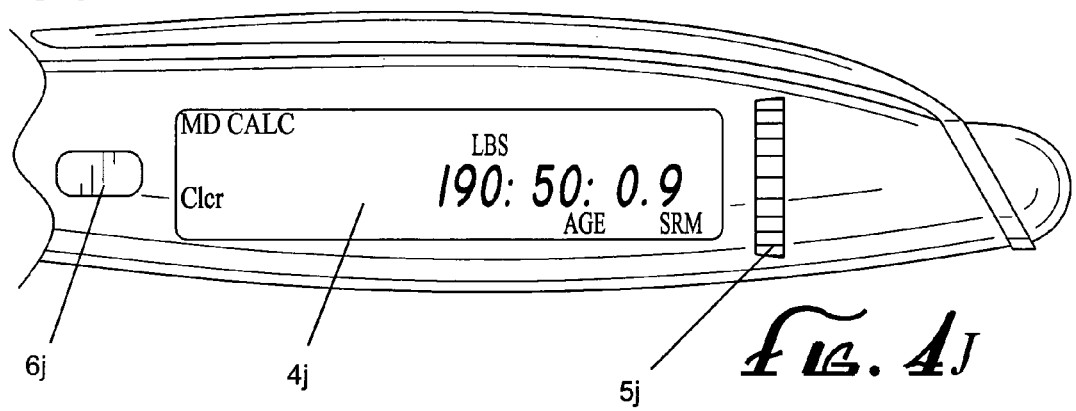
Figure 4K:
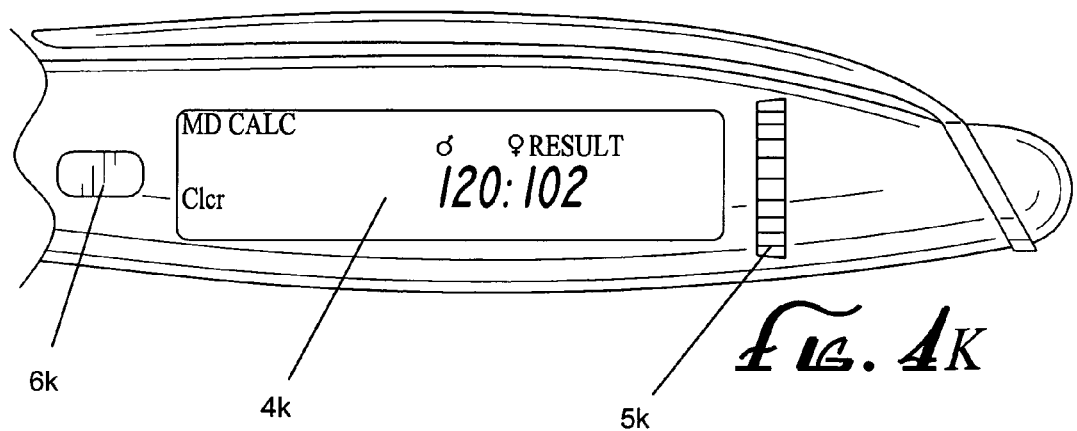
Figure 4L:
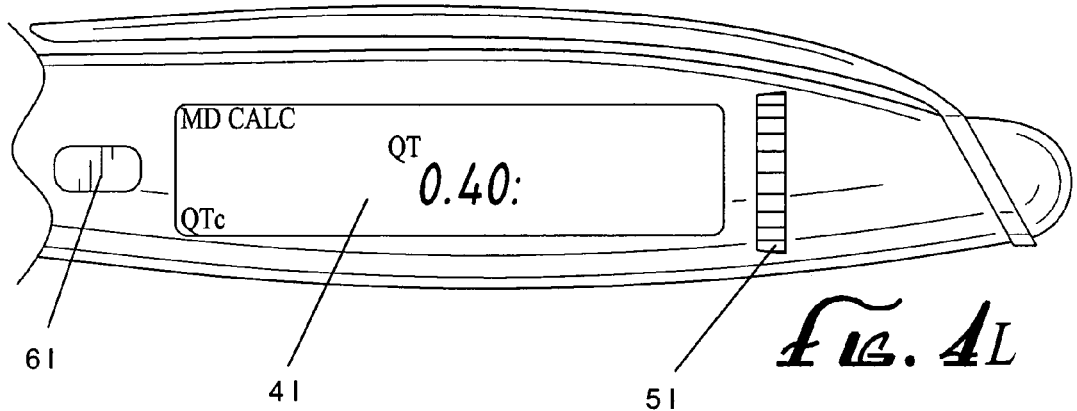
Figure 4M:
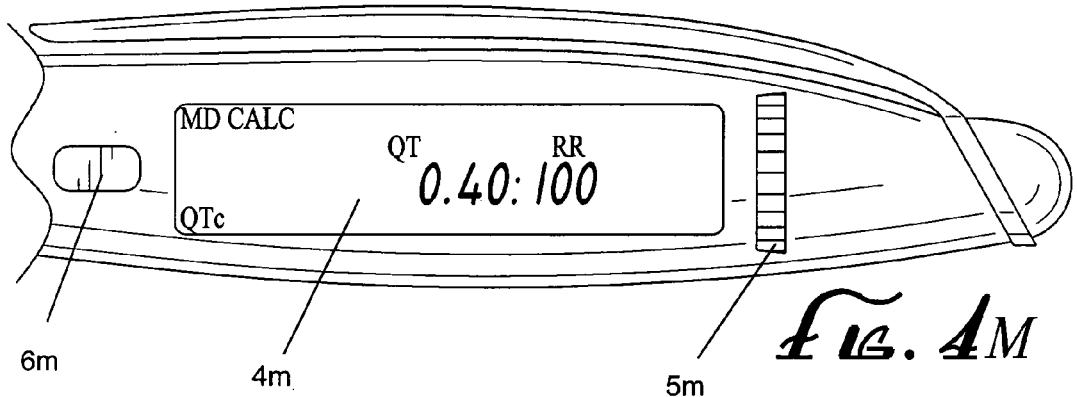
Figure 4N:
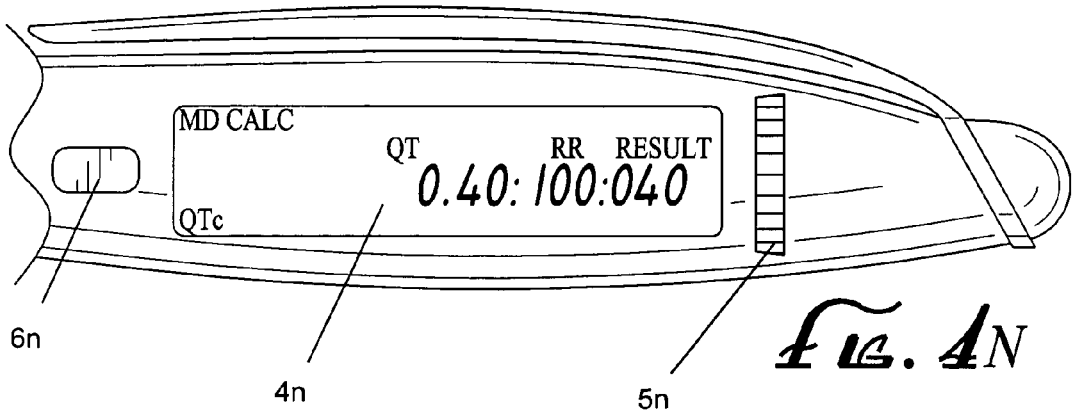
Figure 4O:
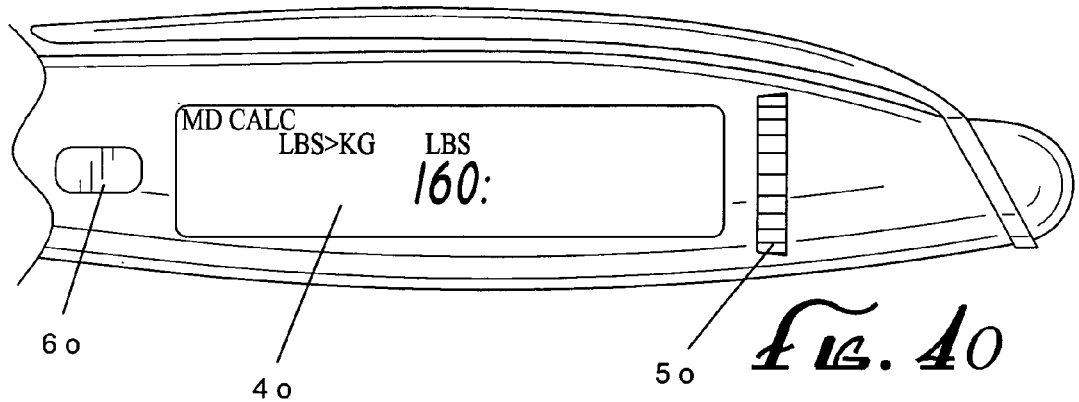
Figure 4P:
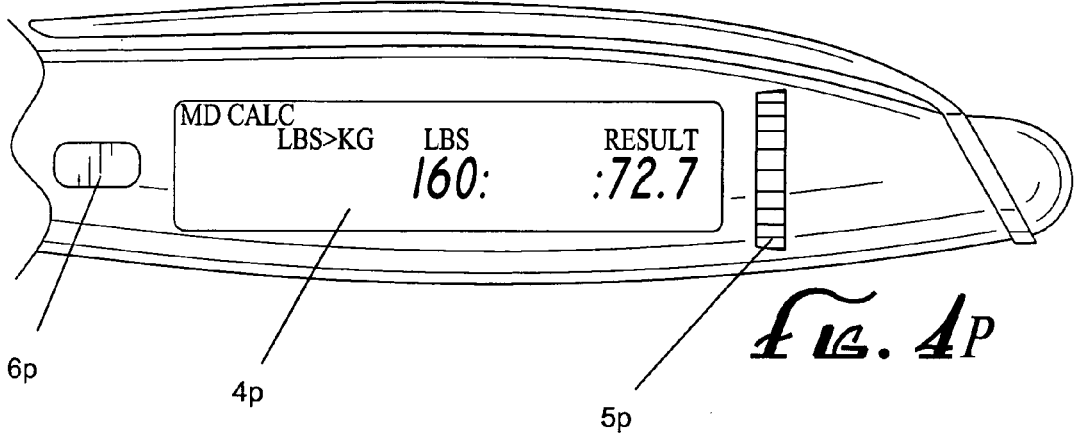
Figure 4Q:
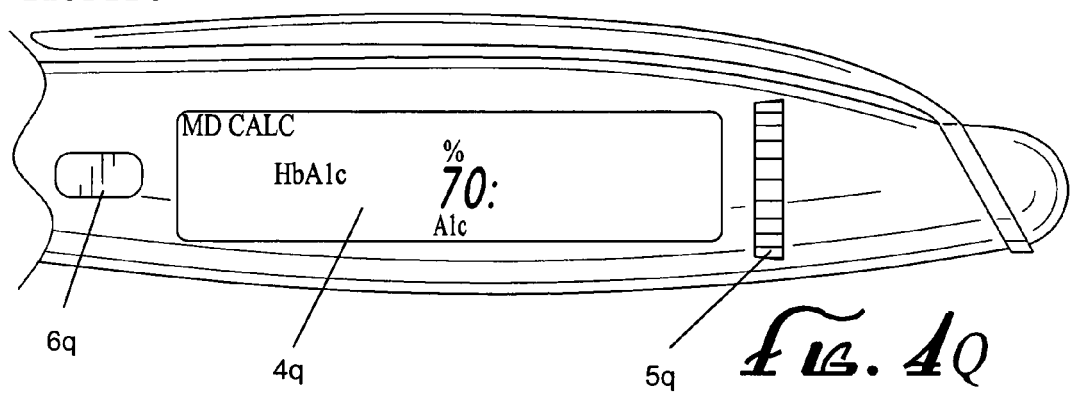
Figure 4R:
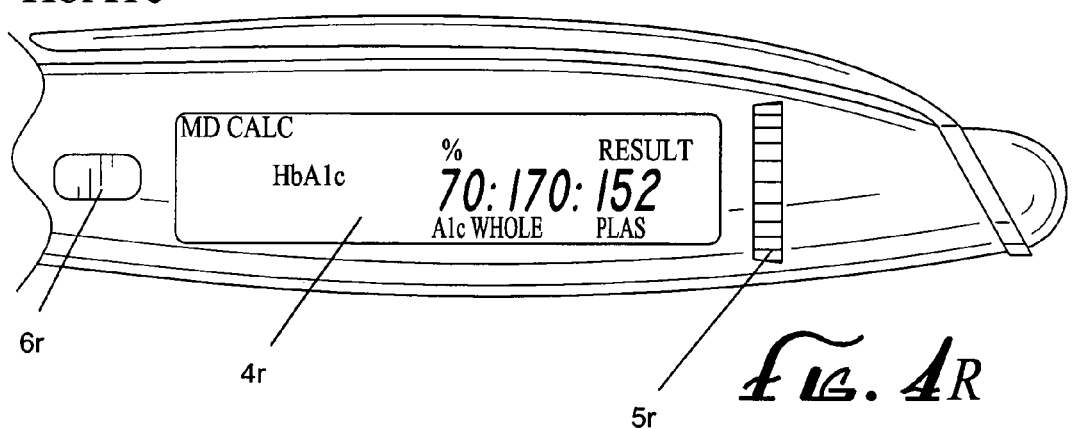
Figure 4S:
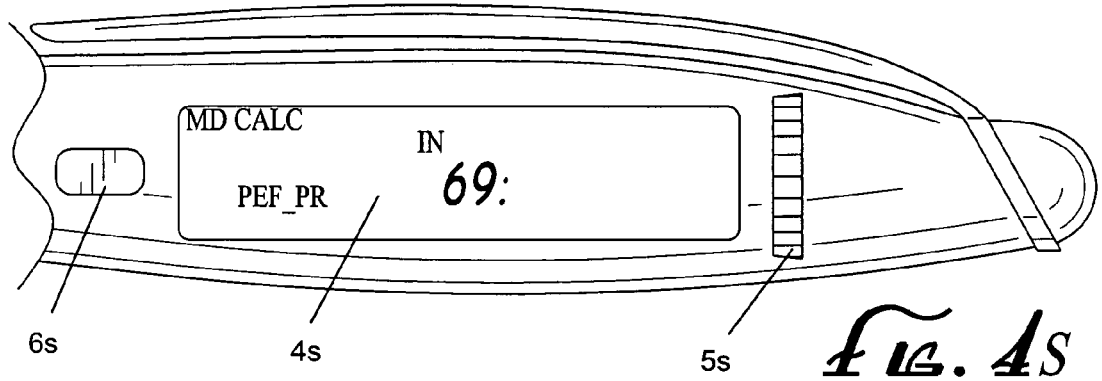
Figure 4T:
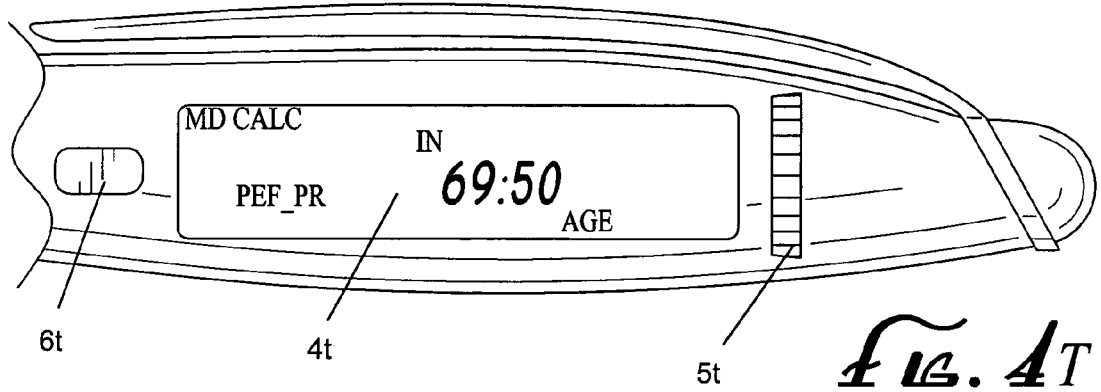
Figure 4U:
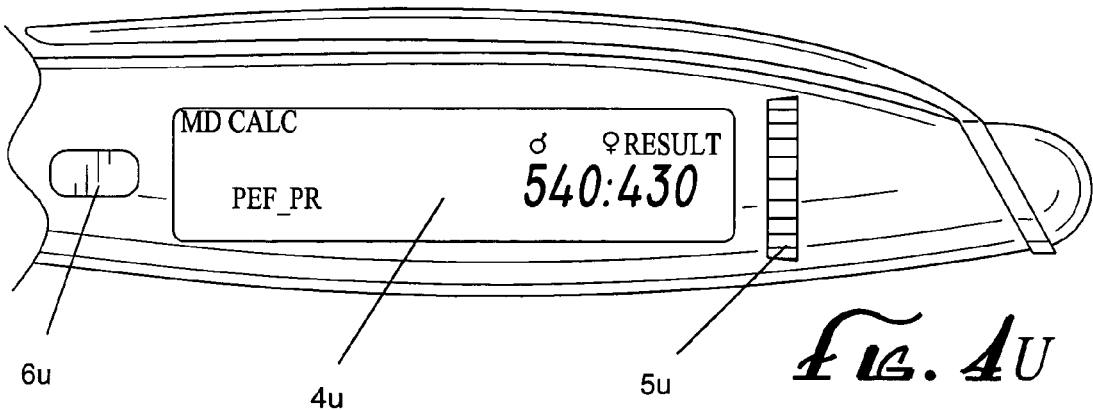
Figure 4V:
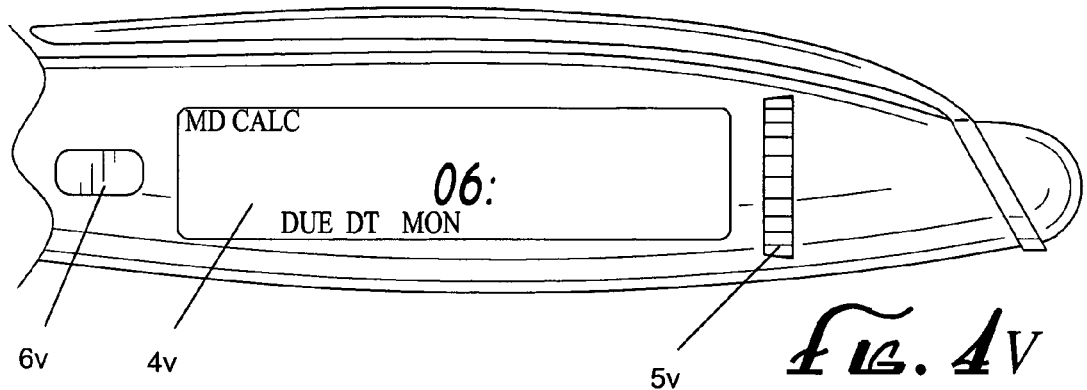
Figure 4W:
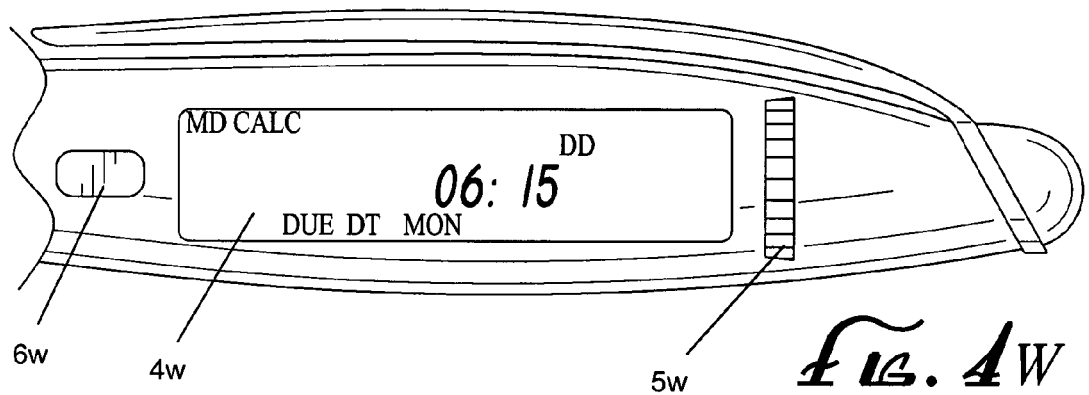
Figure 4X:
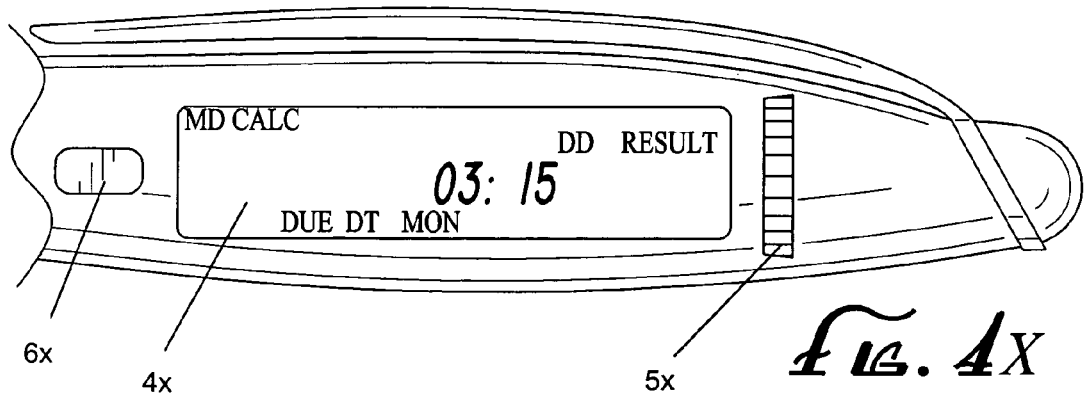

Now referring to FIGS. 4A through 4X, the following section demonstrates how a user would utilize various preferred embodiments to compute a number of human physiology functions which are related and rely upon the user's inputted numerical values for the specific variables. While the following describes a series of related calculations, in an embodiment of the invention, one or more of the described functions may be present.

As an example, the invention may include a Body Mass Index calculation, typically based on the formula $BMI=M/L^2$, where M is the body weight in kilograms, and L is the body height in meters. The user may select the Body Mass Index calculation from the Main Medical Calculation screen 4a, as shown in FIG. 4A. Then referring to FIG. 4B, on the BMI screen 4b, the height in inches ("IN") number will default to 69. The user then rotates the DIAL 5b to scroll the height in inches and presses the DIAL 5b to commit to a numerical value which is thereby input into the calculator, as reflected in FIG. 4C. The user next sees the weight in pounds ("LBS") number variable on the display screen 4c, which will represent the patient's weight, and which similarly defaults to a displayed value of 160 as in FIG. 4D. Using the DIAL 5c to scroll to the appropriate patient weight in pounds the user again press the DIAL 5d to commit that value to the calculator memory. The BMI result will be displayed on the right portion of the display screen 4d, as shown in FIG. 4D.

Under the term "RESULT" viewed on the screen 4d, as shown in FIG. 4D the user now has the option to go back to beginning of the BMI calculation or to go to the Main Medical Calculator screen 4a, which is the Default Screen 4a. After performing the BMI calculation, the user hits the BACK control command 6 twice or holds the BACK control command 6 for 2 seconds in order to return to this default screen 4a. As a further step in this calculation, the user may proceed to depress the DIAL 5d or the BACK control command 6d to then calculate the amount of weight loss required in order to meet a particular BMI value as determined by the health care provider. The invention may be limited to a single such BMI type calculation, or the invention may include a series of calculations based on the similar user input variables, as applied in different preprogrammed formulas.

As disclosed above, the present invention includes at least one of the preprogrammed calculations for a known measure based on scientifically accepted formulas and relationships between the variables. In a more advanced embodiment, the user may manipulate the device to calculate an entire series of different preprogrammed mathematical calculations. The invention may therefore include one, two or any combination of calculations. Referring again to FIG. 4A, the main screen 4a for the invention in an embodiment of a multi-function medical calculator is shown. In this embodiment, there are 8 options to choose from, each describing a specific known mathematical relationship encountered in the medical profession, as displayed below. On this first display screen 4, the user may choose between 8 different calculations such as Body Mass Index ("BMI"), Body Surface Area ("BSA"), Hemaglobin A1C to Mean Plasma Glucose Estimation ("HBA1c"), Creatinine Clearance ("Clcr"), QT Interval Correction (EKG) ("QTc"), Pounds to Kilograms conversion, Predicted Peak Expiratory Flow for men and women ("PEAKFLOW") and Pregnancy Due Date ("DUE DATE"). Additionally the user can select to view or set the time, date and alarm by using the DIAL to scroll to the time function screen. To select a function from one of these available options, an individual would use the DIAL 5a to scroll to desired medical calculation shown on the screen 4a and then press the DIAL 5a to enter or execute command. With reference to FIGS. 4A through 4X, the description below shows how a preferred embodiment may permit the user to navigate through a series of related mathematical calculations, in this case, to determine specific medical and physiological values based on known formulas programmed into the integral calculator and the user inputted variables.

The initial calculation of the Body Mass Index would be accomplished just as described above. Now referring to FIGS. 4A and 4E, by selectively pressing the DIAL 5 and BACK control command 6, the user can navigate to the BSA screen 4*e*, in order to calculate the Body Surface Area as a second calculation, based on formulas well known in the art for such a calculation. On the BSA screen 4*e* the first displayed number will default to 69 as shown in FIG. 4E. Using the DIAL 5*e* to scroll through the range, the user may then select the patient height in inches and press the DIAL 5*e* to commit to value to the calculator memory. Upon so doing, the weight in pounds ("LBS") number, which seeks the patient's weight value, will be active, again defaulting to 160 as shown on the screen 4*f* in FIG. 4F. The user then uses the DIAL 5*f* to scroll to the appropriate patient weight in pounds and presses the DIAL 5*f* to commit that numerical value to the calculator memory. The BSA result will then be displayed on the right hand portion of the screen 4*g*, as shown in FIG. 4G. Once again, the user at that point has the option to go back to the beginning of the BSA calculation or to return to the Main Medical Calculator screen 4*a*, using the BACK control command 6*g* command, just as described above.

In the preferred embodiment of a medical pen calculator device, the user may next use the invention to compute the Creatinine Clearance numerical value for the patient, based on formulas well known in the art for such a calculation. By selecting the Clcr function screen from the Main Medical Calculator screen 4*a* (See FIG. 4A), the user may begin the computation. On the Clcr screen 4*h*, as shown in FIG. 4H, the weight in pounds value ("LBS"), corresponding to the patient's weight, defaults to 190. Using the DIAL 5*h*, to scroll up or down to the correct numerical value corresponding to the patient's weight, the user may press the DIAL 5*h* to commit the appropriate numerical value to the memory, as shown in FIGS. 4H and 4I. Upon committing that value, the AGE screen 4*i* is displayed and defaults to 50 as in FIG. 4I. Using the DIAL 5*i*, to scroll the AGE value to that corresponding to the patient's age, the user then presses the DIAL 5*i* to commit that value to the memory. Upon committing the AGE value, the SERUM number will be active on the screen 4*i*, defaulting to 0.9. Referring to FIG. 4J, once again, using the DIAL 5*j* to scroll to the appropriate SERUM creatine value measured in mg/DL, the user presses the dial to commit that value to the calculator, which enters the final required numerical value and the Clcr result will be displayed on the screen 4*k*, as shown in FIG. 4K. The results for the Clcr value, are displayed on the screen 4*k* for both men and women with male/female symbols located on the screen 4*k* above each value. Upon display of the Clcr result on the RESULT screen 4*k*, just as above, by selecting and pressing or holding the BACK control command 6 the user may return to either the beginning of the Clcr calculation screen 4*h* or the Main Medical Calculator screen 4*a*.

The next in a series of medically related computations could be the QT Interval Correction (EKG) value, based on formulas well known in the art for such a calculation. To reach this calculation, the user selects the QTc screen 4*l* from the Main Medical Calculations menu 4*a* (See FIG. 4A). Upon so doing, on the QTc screen 4*l* the QT value defaults to 0.40, as shown in FIG. 4L. The DIAL 5*l* is again used to scroll QT value up or down to the appropriate patient value and pressing the DIAL 5*m* commits this value to the memory. Upon committing this value, the heartbeat resting rate, referred to as the "RR" number will be active on the screen 4*m*, defaulting to 1.00. The DIAL 5*m* then permits the user to scroll the RR value up or down to select the appropriate value as measured from the patient and press the DIAL 5*m*, to commit the value to the calculator. The QTc numerical result is then displayed on a portion of the screen 4*n*. Just as in the above examples, the user may then return to the start of the QTc calculation screen 4*l* or to the Main Medical Calculations menu screen 4*a* by means of the BACK button command 6*n*.

A next calculation in a desired series of medical calculations might be the Hemaglobin AlC to Mean Plasma Glucose Estimation ("HBA1c"), based on formulas well known in the art for such a calculation. Referring now to FIG. 4Q, to compute this value, the user first selects the HbA1c display mode on the display screen 4*q*, by selectively pressing an input mode button. On the HbA1c screen 4*q*, the displayed value defaults to 7.0%. Using the DIAL 5*q* to scroll up to 12.0% or down to 4.0% the user may press the DIAL 5*q* once to commit a desired value and have the results displayed on the screen 4*r*. On the RESULT screen 4*r* the user now has the option to go back to beginning of the HbA1c calculation screen 4*q*, or to once again return to the Main Medical Calculator screen 4*a*. To return to the Default main medical Screen 4*a*, the user depresses the BACK button command 6 twice or holds the BACK button command 6 for 2 seconds.

In a medical calculation scenario, the user may next desire to determine the Predicted Peak Expiratory Flow (PEAK-FLOW) for a male or female patient, again based on formulas well known in the art for such a calculation. By once again selecting the PEAKFLOW screen 4*s* from the display screen 4*a*, the user would see that the height (in inches) value, designated as "IN" defaults to 69. Using the DIAL 5*s*, the user can then scroll to the patient's height in inches and press the DIAL 5*s* to commit to the desired value. Next, the Patient's age value numbers will be active, defaulting to 50. Again, by using the DIAL 5*t*, the user may scroll to the patient's age and press the DIAL 5*t* to commit a specific age value. The PEAKFLOW result will be displayed on the screen 4*u*, as indicted by the symbol for male or female above the result for each sex. On the RESULT screen 4*u*, the user now has the option to go back to beginning of PEAKFLOW calculation screen 4*s*, or to return to the Main Medical Calculator screen 4*a*. To return to the Default Screen 4*a*, the user depresses the BACK command 6*u* twice or holds the BACK command 6*u* for 2 seconds.

In its preferred embodiment as a multi-function preprogrammed calculating implement, the invention is also capable of performing less sophisticated yet very desirable calculations. For example, it may be used to retrospectively calculate a pregnant woman's due date ("DUE DATE"). By selecting the appropriate month from the DUE DT screen 4*v* ("MON") using the DIAL 5*v* to scroll up or down from 01–12 months then using the DIAL 5*w* to scroll up or down from 1–31 days and committing these values, the due date result will be displayed on the right side of the screen 4*x*.

Similarly, the user may perform a fast conversion from pounds to kilograms and the reverse, as some medications, devices and other necessary treatment aids must be based on a patient's weight in kilograms, for example. These basic though helpful calculations are based on formulas well known in the art for such calculations. The preferred embodiment of the invention in the configuration of a medical calculator may further include a conversion display screen 4*o* and the associated commands to selectively perform the conversion calculations. The user would follow much the same procedures as those outlined above for the various calculations described (See FIGS. 4*o* and 4*p*).

Regardless of the specific embodiment, the implement would typically also include additional features for user convenience and improved performance. For example, a power on/off switching device would be added as either a separate control or as a sequential command on the present input controls. In addition, a power saver feature is contemplated to be included within the scope of the invention. This feature would function to dim or otherwise reduce the power to the electronic calculator in the event some predetermined time period has lapsed since the most recent operation of any of the input control commands or controls.

Based upon the requirements of the user, the field of endeavor and desired calculations, as delineated above, the present invention may be preprogrammed to perform a single calculation or to perform a series of calculations of interest to a specific profession or interest. While the preferred embodiment discussed above and displayed in the associated figures involves an implement for the medical field, the present invention is contemplated to include a device capable of computing related calculations involving specific mathematical relationships arising in a particular field, such as those encountered in career fields including, but not limited to, human physiology, medicine, real estate, mortgage banking, engineering, vehicle sales or leasing, nursing, banking, automotive technology, aerospace, plumbing, electrical, construction, chemistry, statistics, sports, food manufacturing, baking, beverage production and mixology. For example, in a mortgage banking or car loan scenario, the implement might be preprogrammed to calculate the amount of interest, monthly payments, down payment, estimated closing costs, and many other values encountered in that field on a daily basis. These calculations would be based on formulas well known in the art for such a calculation.

Finally, it is contemplated that any of the numerous generally planar surfaces of the hand held implement, including the display screen itself, are well suited for and may be utilized for the imprinting of graphical or advertising material for the purposes of advertising or promotion.

What is claimed is:

1. A hand held implement comprising:
   an elongated body having a first end and an opposing second end;
   an implement tip extending from the first end; and
   an electronic calculator disposed in the body, the calculator being preprogrammed with at least one mathematical formula, each having at least one algebraic operation and at least one variable assigned a numerical value thereto by user input, wherein each of the at least one formulas has at least two variables and at least two different types of algebraic operations,
   wherein selection of the at least one formula by inputting numerical values for each variable thereof allows the calculator to perform calculations solely therewith without further input from the user to produce an output corresponding to the at least one formula selected.

2. The implement of claim 1, wherein the calculator has at least two different preprogrammed formulas that are known in a single field of profession.

3. The implement of claim 1, further comprising a display screen disposed on the body for displaying symbols representing the at least one formulas to aid visual selection by the user, the variables of the selected formula, the numerical values assigned to the variables, and the output corresponding to the at least one formula selected.

4. The implement of claim 3, further comprising at least one of a clock and a programmable timer whose signals are displayed on the display screen.

5. The implement of claim 1, further comprising input controls disposed on the body for selecting the at least one preprogrammed formula and for inputting a specific numerical value for each variable thereof.

6. The implement of claim 1, wherein the implement further includes a power switch control.

7. The implement of claim 1, wherein the implement further includes a power saving means by which the power consumption of the implement may be reduced.

8. The implement of claim 1, wherein said hand-held implement is selected from the group consisting of a writing instrument, a laser pointer, a stylus pen, a multi-function writing instrument, a screwdriver, and a tire pressure gauge.

9. The implement of claim 1, wherein at least one end further includes a stylus tip.

10. The implement of claim 1, wherein the particular field of profession corresponding to each of the at least one formulas is selected from the group of fields consisting of: human physiology, medicine, real estate, mortgage banking, engineering, vehicle sales or leasing, nursing, banking, automotive technology, aerospace, plumbing, electrical, construction, chemistry, statistics, sports, food manufacturing, baking, beverage production and mixology.

11. The implement of claim 1, wherein advertising or graphical material is imprinted on at least one outer surface of the implement for the purpose of advertising or promotion.

12. A handheld implement comprising:
   an elongated body having a first end and an opposing second end;
   an implement tip extending from the first end;
   an electronic calculator disposed in the body, the calculator being preprogrammed with at least one mathematical formula, each having at least one algebraic operation and at least one variable assigned a numerical value thereto by user input, wherein each of the at least one formulas has at least two variables and at least two different types of algebraic operations;
   input controls disposed on the body for selecting one of the at least one preprogrammed formulas and assigning a numerical value to each variable thereof; and
   a display screen disposed on the body for displaying symbols representing the at least one formulas to aid visual selection by a user, the variables of the selected formula, the numerical values assigned to the variables, and an output of calculation corresponding to the selected formula,
   wherein selection of the at least one formula by inputting numerical values for each variable thereof allows the calculator to perform calculations solely therewith without further input from the user to produce an output corresponding to the at least one formula selected.

13. The implement of claim 12, further comprising at least one of a clock and a programmable timer whose signals are displayed on the display screen.

14. The implement of claim 12, wherein the handheld implement is selected from the group consisting of a writing instrument, a laser pointer, a stylus pen, a multi-function writing instrument, a screwdriver, and a tire pressure gauge.

15. The implement of claim 12, wherein at least one end further includes a stylus tip.

16. The implement of claim 12, wherein the particular field of profession corresponding to each of the at least one formulas is selected from the group of fields consisting of: human physiology, medicine, real estate, mortgage banking, engineering, vehicle sales or leasing, nursing, banking, automotive technology, aerospace, plumbing, electrical, construction, chemistry, statistics, sports, food manufacturing, baking, beverage production and mixology.

17. The implement of claim 12, wherein advertising or graphical material is imprinted on at least one outer surface of the implement for the purpose of advertising or promotion.

18. The implement of claim 12, wherein at least two of the preprogrammed formulas are known in a single field of profession.

19. The implement of claim 18, wherein the at least two formulas known in a single field of profession are mutually related to share at least one common variable for which the inputted numerical value used in a calculation using one of the related formulas is stored in the calculator to be reused in subsequent calculations using different related formulas, thereby obliterating the necessity of reentering the numerical value.

20. A method of advertising comprising the steps of:
(a) providing a handheld implement comprising:
an elongated body having a first end and an opposing second end,
an implement tip extending from the first end, and
an electronic calculator disposed in the body, the calculator being preprogrammed with at least one mathematical formula, each having at least one algebraic operation and at least one variable assigned a numerical value thereto by user input, wherein each of the at least one formulas has at least two variables and at least two different types of algebraic operations,
wherein selection of the at least one formula by inputting numerical values for each variable thereof allows the calculator to perform calculations solely therewith without further input from the user to produce an output corresponding to the at least one formula selected; and
(b) imprinting advertising material on an outer surface of the implement.

* * * * *